March 11, 1941. E. L. YOUNG 2,234,214
METHOD OF PRODUCING LAMINATED SHIMS
Original Filed July 23, 1935 3 Sheets-Sheet 1
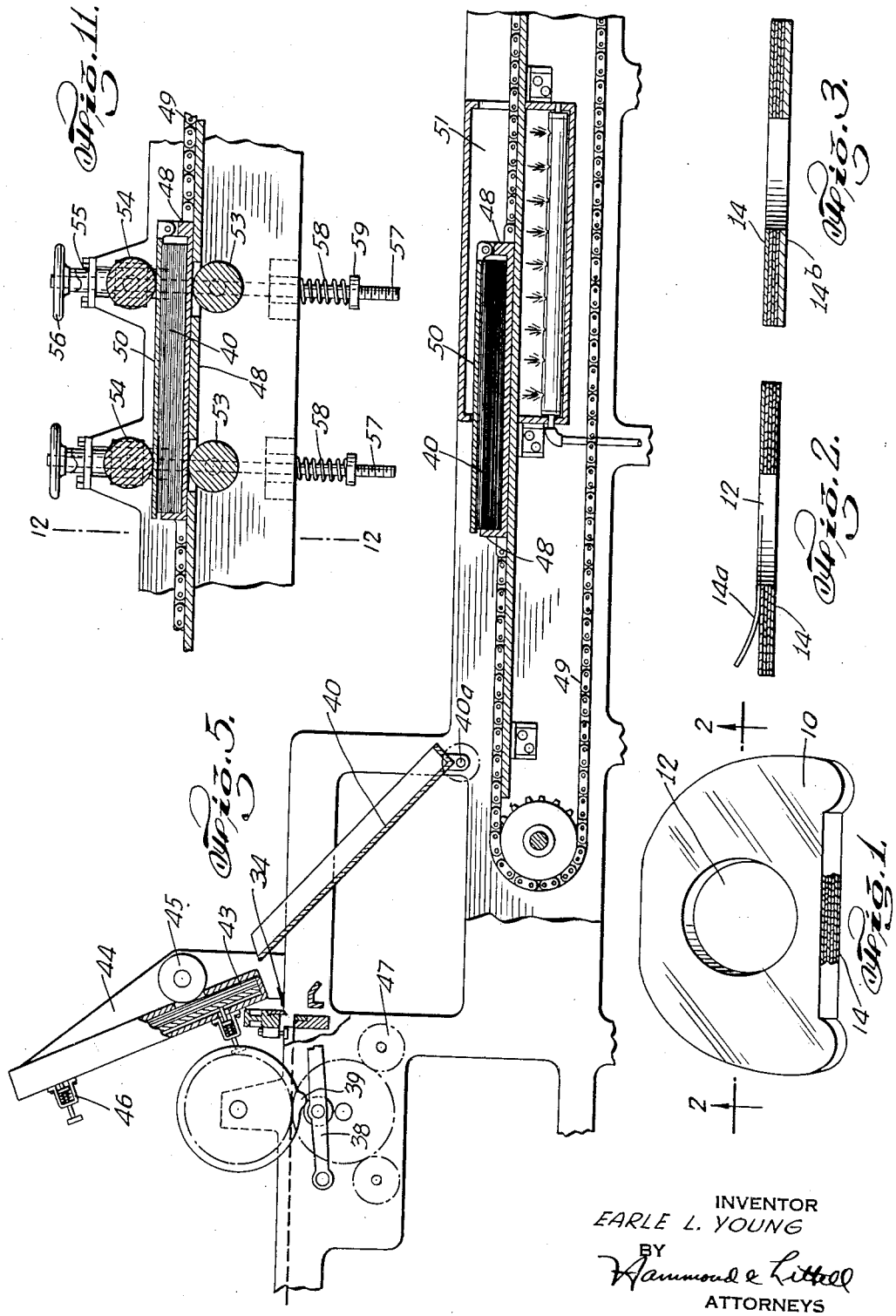
INVENTOR
EARLE L. YOUNG
BY
Hammond & Littell
ATTORNEYS March 11, 1941.   E. L. YOUNG   2,234,214
METHOD OF PRODUCING LAMINATED SHIMS
Original Filed July 23, 1935   3 Sheets-Sheet 2
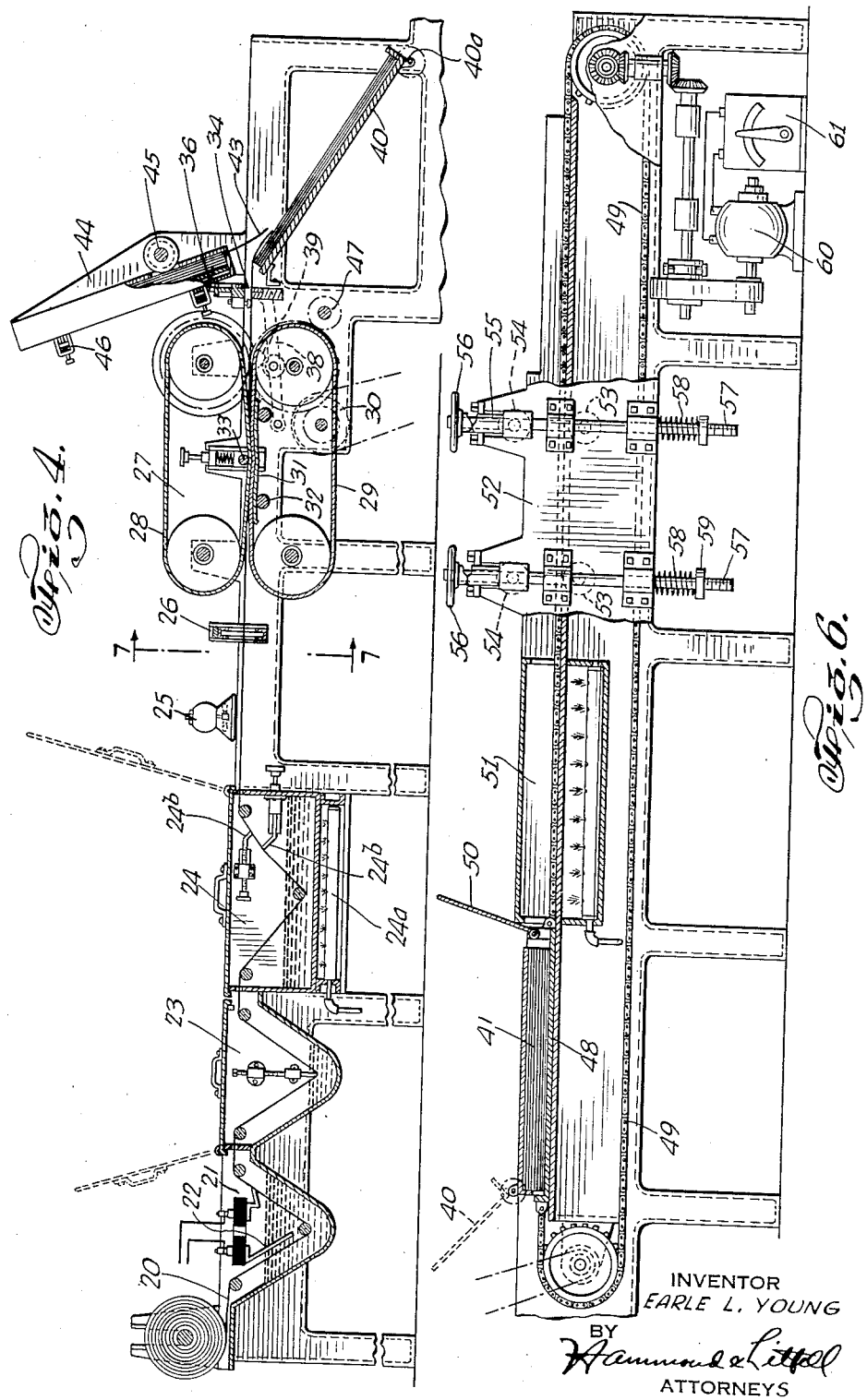
INVENTOR
EARLE L. YOUNG
BY
Hammond & Littell
ATTORNEYS March 11, 1941.  E. L. YOUNG  2,234,214
METHOD OF PRODUCING LAMINATED SHIMS
Original Filed July 23, 1935  3 Sheets-Sheet 3
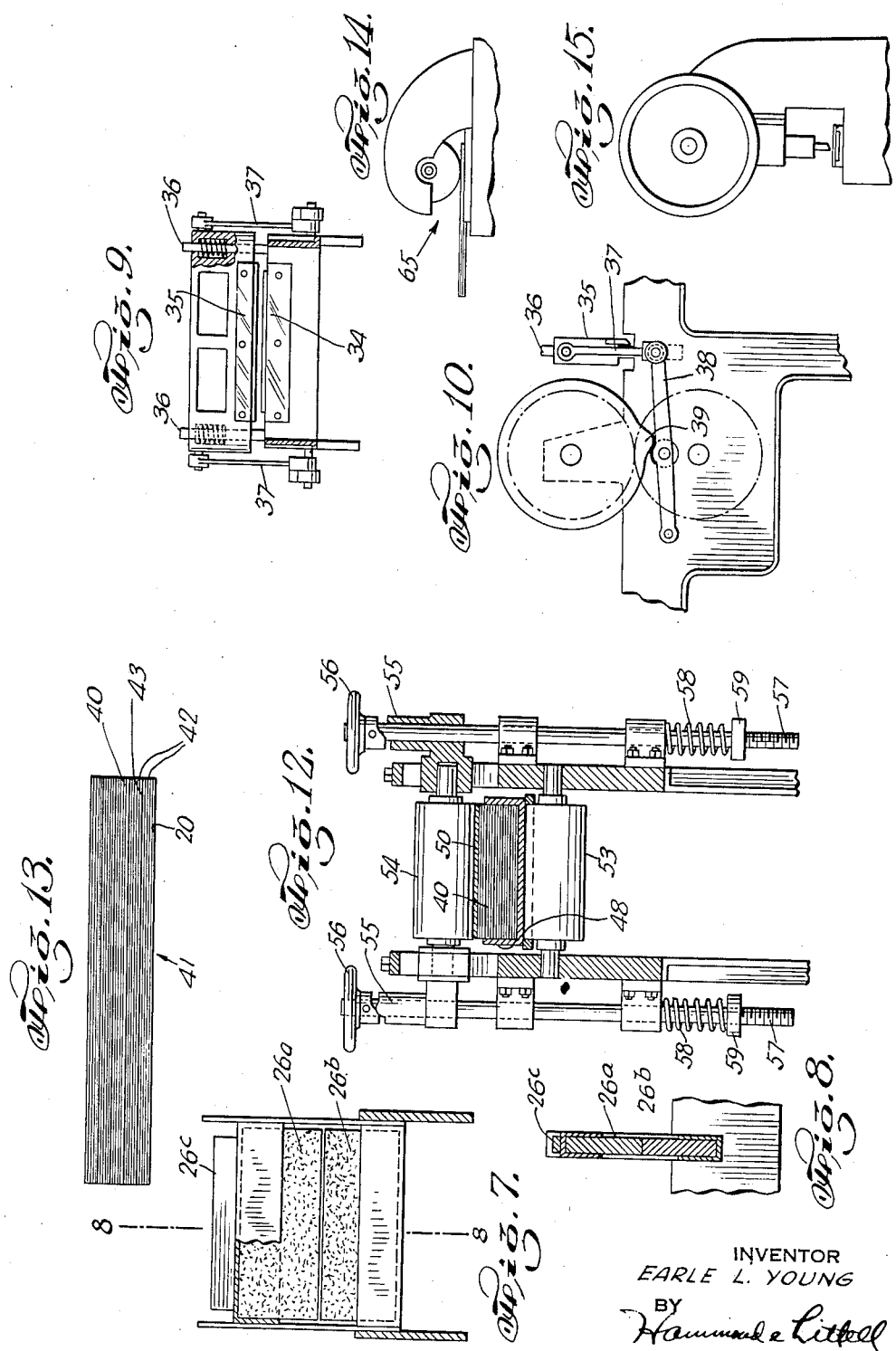
INVENTOR
EARLE L. YOUNG
BY
Hammond & Littell
ATTORNEYS Patented Mar. 11, 1941

2,234,214

UNITED STATES PATENT OFFICE 2,234,214

METHOD OF PRODUCING LAMINATED SHIMS

Earle L. Young, Awosting, N. J., assignor, by mesne assignments, to Laminated Shim Co., Inc., Glennbrook, Conn., a corporation of Connecticut Original application July 23, 1935, Serial No. 32,724. Divided and this application May 28, 1938, Serial No. 210,594

5 Claims. (Cl. 29—148)

This invention relates to improvements, methods and apparatus for the manufacture of shims of the laminated type in which the laminae may be peeled or stripped from the pack and is a division of my copending application Serial No. 32,724, filed July 23, 1935, now Patent No. 2,124,866.

One of the principal objects of my invention is to provide an improved method for producing a laminated shim having a plurality of laminae so bonded together that they will normally maintain a compact packed shape and will not curl or come loose from the pack under ordinary conditions of handling and installation and in which the laminae may be peeled or removed from the pack as desired for adjustment purposes.

Another object of my invention is to provide an improved method of manufacturing a laminated shim having steel laminae which comprises coating the laminae with a non-ferrous coating and then bonding the laminae together with a less adhesive bonding agent which thinly and uniformly covers the laminae so that the shim pack will be of a thickness substantially equal to the multiple thickness of the respective laminae and so that the laminae will be held with an adhesive force which is less than the cohesive force of the thin laminae, but which is adequate to prevent curling or accidental separation.

Another and more specific object of my invention is to provide an improved method for producing a laminated shim having thin layers or laminations bonded to each other by a bonding agent which is uniformly spread over the entire surface and subsequently partially squeezed out to firmly bind the laminations together, such bond being adequate to hold the laminations in position during forming of the shim as on a punch press whereby there is a minimum of handling of loose elements, the laminated shim stock being initially cleaned of all bonding material on the outer surfaces so that the final shim is ready to use and will not adhere to the parts between which it is used.

Further objects and advantages of my invention will appear from the following description thereof taken in connection with the attached drawings, which illustrate a preferred form of embodiment of my invention, and in which Fig. 1 is a perspective view with parts in section of one type of laminated shim.

Fig. 2 is a vertical section taken substantially along the line 2—2 of Fig. 1, showing one of the laminae partially peeled from the pack.

Fig. 3 is a vertical section similar to that shown in Fig. 2 but showing a modified type of shim.

Fig. 4 is a vertical section of a portion of the machine on which the shim may be produced.

Fig. 5 is a vertical section with parts broken away of another portion of the machine shown in Fig. 4.

Fig. 6 is a vertical elevation of the remaining portion of the machine shown in Fig. 4.

Fig. 7 is a vertical section taken at right angles to the machine and along the line 7—7 of Fig. 4 with parts broken away showing the acid applying apparatus.

Fig. 8 is a vertical section taken at right angles to Fig. 7 and substantially along the line 8—8 thereof.

Fig. 9 is an end view of the knife structure.

Fig. 10 is a side elevation of a part of the knife operating mechanism.

Fig. 11 is a vertical section showing parts of the press.

Fig. 12 is a vertical section taken at right angles to Fig. 11 and substantially along the lines 12—12 thereof.

Fig. 13 is an elevation of a temporary stack of laminated shim stock.

Fig. 14 is a diagrammatic side elevation of a buffer, and

Fig. 15 is a diagrammatic elevational view of a punch press.

Laminated shims of the general type shown in Darrach Patent No. 1,933,050, granted October 31, 1933, have gone into widespread use in various mechanical fields and especially in connection with the adjustment of split bearings for internal combustion, Diesel and other engines, and for many other purposes. Such shims, however, have been usually made of brass or other copper alloys and more recently and to a smaller extent of bonded steel laminations. In attempting to make laminated steel shims, it has been found that a metallic bonding agent which is adequate to prevent curling of the laminae and to hold the laminae in a pack during stamping, shipping and installation is often so strong that the steel laminae cannot be cleanly peeled from the pack without tearing of the laminae.

I have found that I can produce a highly satisfactory laminated steel shim by using a steel of the desired thickness which may be as low as one-thousandth of an inch, by initially plating the steel with a non-ferrous coating and then using a suitable bonding agent such as of the lead-tin series. I find that of the non-ferrous coatings copper applied by electro deposit from a suitable copper salt solution such as copper sulphate to be the best although other materials are available. Copper bonds very well with steel however and copper plating will not peel from the steel and will serve as a suitable intermediate bonding agent between the steel and the solder. The steel used is preferably a hard or semi-hard cold rolled low carbon steel.

With a copper coated steel, I can use different metallic binders, but I find a high lead solder which has over 50% lead to be most suitable. This principal bonding agent holds the laminae together in a satisfactory manner and prevents curling or loosening of the laminae except by the desired peeling as with a knife when a change in size is required for adjustment purposes. Such a bonding agent, cooperating with the intermediate non-ferrous coating, has many of the characteristics of the former brass shims and with the bond less than the cohesive strength of the steel laminae, the laminae may be freely peeled from the pack to leave a smooth and clean surface.

While the method and apparatus of the present invention will be described largely with reference to the production of laminated steel shims, it will be understood that the method and apparatus is also applicable to the production of laminated shims and laminated shim stock of other materials, such as brass, or the like.

Typical shims 10 made in accordance with my process are shown in Figures 1 to 3. As is well known practice with laminated shims, the shim 10 is adapted to be placed between bearing halves which are drawn tight by bolts which may pass through suitable holes or slots 12 and such shim thereby acts as a spacer for accurate spacing of the bearing to the shaft or rotating member and permits ready adjustment of the bearing by the removal of one or more laminae as required. With the steel shim there is far less tendency of the shim to become reduced in thickness or squeezed out and the bearing parts may be drawn together with a greatly increased pressure over that possible with brass shims. The steel shim will also remain of substantially uniform thickness to maintain the correct diameter for the bearing and adjustments may be more accurately carried out.

The shim 10 is preferably made as a compact unit of separate laminae of the order of two-thousandths of an inch or more in thickness. Such thin laminations can be more uniformly compacted from roll stock due to the absence of grease and dirt and other foreign substances which I eliminate in my continuous coating process, and I find that forming a stock of laminae from which the shim is finally cut out is most satisfactory. The size of the shim stock varies with the specific requirements but usually there are five or more laminae of two-thousandths or three-thousandths of an inch thereby forming laminated shim stock of ten or fifteen-thousandths of an inch from which the individual shims can be punched. Other combinations are possible as is obvious, and in some cases, I find it desirable to use a rather heavy backing plate 14b as shown in Figure 3, such plate similarly being compacted with the thinner laminae. The shim may also have a babbitt tip as shown in Darrach Patent No. 1,933,050, above referred to. In any of these forms of shim, peeling one or more laminae, such as indicated at 14a in Figure 2, will reduce the thickness for adjustment.

The preferred method by which my product may be made is illustrated in connection with the machine shown in Figures 4 to 12 which is one type which is adapted for substantially automatic continuous formation of shim stock which is a layer of bonded laminae ready for stamping. It is, of course, to be understood that the machine represented is not the only one capable of forming laminated shim stock, but it is one which I find suitable for carrying out my preferred process.

The preliminary step which is required in accordance with one embodiment of my invention for the production of laminated steel shims is the production of steel strip coated with a non-ferrous material. As I find that copper plating is preferable, I may either purchase a copper plated steel strip, or I may take steel in strip form generally represented at 20 in Figure 4 and pass it through the electroplating tank 21 containing a plating bath and having an electrode 22 and give the strip a flash coat of electroplated material. For convenience, I have shown this diagrammatically as one step in my continuous operation, although it can be accomplished in an entirely separate machine if desired. Where laminated brass shims are being produced, the plating apparatus and step may be omitted.

The strip is next coated with solder or other suitable bonding agent, and in applying solder I pass the strip through a fluxing and cleaning tank 23 and a solder bath tank 24, the solder in the tank 24 being maintained in a molten condition by means of burners 24a and the surplus solder being removed from the strip by wipers 24b. The solder is preferably of a high lead type as heretofore mentioned and it will coat both sides of the strip 20.

After the strip 20 is coated with solder, I find it desirable to cool it as by means of a fan 25 and to then coat it with a suitable material to prevent oxidation, such materials being applied to both sides of the strip as shown at 26 and as shown in greater detail in Figures 7 and 8. A convenient form of apparatus for applying such material includes a pair of blocks 26a and 26b of the suitable oxidizing inhibitor, such as stearic acid, which are weighted by the weight 26c to contact with the strip 20 as it passes between the blocks. Various other means of applying such a coating will of course be apparent.

The coated strip is preferably drawn through the various respective baths and from the original roll or spool by a suitable feeding means generally represented at 27 and conveniently consisting of a plurality of belts 28 and 29 which are of web type and carried by drums suitably driven from the drive mechanism 30. The strip of stock is so thin and fragile that feeding should be uniform and with the maximum surface contact. I obtain such uniformity by providing a table 31 mounted on suitable supports 32 on which the lower belt rests and I provide a tension roll 33 for the upper belt, such tension roll being spaced in triangular relation with the supports 32 of the table 31 so that there is adequate draft on the strip 20.

I also prefer to use the feeding means 27 as the source of operating power for the severing device generally represented at 34 in Figures 9 and 10. One type of severing device which I find satisfactory includes a movable knife 35 which is reciprocated on the guide pins 36 by the links 37 from pivoted lever arms 38 moved from cams 39 which may be on one set of the belt driven drums. Such a severing device will periodically sever a fixed length of strip and such strips will then fall by gravity onto the inclined table 40.

I find that for further operations, it is desirable to build up a stack of laminated shim stock, such stack being generally represented at 41 in Figure 13. The stack preferably includes several groups of laminated shim stock 42, each group having the required number of individual laminae to provide the thickness for one shim. The overall thickness of the stack 41 is then approximately one-quarter to three-eighths of an inch and such that it can be conveniently handled in the further steps of my process. It is of course to be understood that if thick plate shims such as shown in Figure 3 are to be made, the thick body plate may be placed in suitable position with respect to the proper number of laminae so that they are all pressed together as described hereinafter. Preferably the outside laminae strip of each separate group of laminae is of uncoated brass which has been cleaned with the fluxing material and cut to the proper length. In the subsequent compacting operation there is sufficient solder on the inside laminae of the layers to fuse and adhere to the unsoldered outside laminae.

In order to prevent the respective groups of shims from sticking together by flow of solder between the groups, I place a spacer 43 between each group of laminated stock, such spacer preferably being one which is substantially incompressible, and not affected by the heat and pressure later applied in the process. Oxidized steel sheets or other materials having these qualities can be used for this purpose as they will not stick to the solder and make a highly desirable spacing member during the pressing and squeezing out of the solder as subsequently carried out. One manner of placing these spacers in the right sequence is by spacer feeding means 44 having the feed wheel 45 which is driven at the desired rate to feed the spacers 43 between the respective groups of laminae 42, one spacer 43 being moved downward after a predetermined number of separate laminae are placed on the inclined table 40 until the stack is completed. The spring member 46 forces the respective spacers into position against the feed wheel 45 which may be driven by any suitable related or independent source. After I have built up a complete group shown as indicated at 41 in Figure 13, I then deposit the entire pack in the pressing envelope 48 by suitably rotating the shaft 40a. It is of course to be understood that this step may be carried out manually or by any other desired means. The shim stack 41 now includes a group of shim elements and spacers in which the respective inside laminae are separately coated on both sides by the bonding agent which has a substantial thickness sufficient to fuse and bond the uncoated outside laminae of each group. In this manner the solder does not fuse to the spacers. Due to variations in temperature and speed of transfer through the solder bath, this coating may vary in thickness and in order to produce a usable shim, it is necessary to heat the respective elements, force out the surplus bonding agent and roll to a uniform thickness which I accomplish in the following manner.

After the shim pack 41 is placed in the envelope 48 as shown in Figure 6, the pivoted cover 50 of the envelope is moved into place to protect the shim pack from creeping as it passes through the press. The entire shim pack and envelope are then drawn by the chain 49 through the oven 51 and into the press 52 which is adapted to squeeze out the heated solder from between the respective laminations. The chain may be driven by a suitable motor 60 and gearing, the motor being controlled as by controller 61 which will control the movement of the envelope in each direction or by a manually operated windlass.

The press 52 may be of any desired type but as shown, is provided with a plurality of fixed rolls 53 and a plurality of adjustable rolls 54 which contact with the envelope. The rolls 54 are carried by adjustable journals 55 and are maintained under the desired tension by means of hand wheels 56 carried on the shafts 57 and the springs 58 which abut collars 59. It is of course to be understood that the adjustable collars 59 are adapted to be loosened or tightened for the desired pressure and for convenience the hand wheels 56 are provided with quick acting cams so that the rolls 54 may be quickly released for the return movement of the envelope.

It is to be understood that this machine is only one exemplification of the equipment by which my laminated shims may be made. It represents, however, the plating, coating, cutting and stacking operations of the laminae and the heating, compressing and forming of the shim stock. No hand work or expensive assembly is required and the punchers can punch out the completed shim from the shim stock and to the exact size in all respects.

After the laminae have been heated and compacted to squeeze out surplus solder and removed from the envelope, the separate packs of shim stock are then passed through a suitable buffer 65 (diagrammatically shown) in which the top and bottom surfaces of the laminated group are polished clean by the removal of surplus solder which may have been squeezed out thereon during the pressing and bonding operation. From the shim stock thus formed laminated shims of the desired size and shape may be formed by any suitable punching and forming operation, as, for example, in punch presses, using suitably shaped dies, such as diagrammatically shown at 66 which I find most effective for the all laminated type shim of Figures 1 and 2.

When steel shims having the non-ferrous coating are produced by the method here described, they are within a very small tolerance of a thickness which is equal to the multiple of the laminations themselves, and I am therefore able to obtain a proper and uniform size of lamination which is especially desirable for standard operations. In all probability the pressing operation expels a large percentage of the solder so that the shims are substantially all rolled metal. They are not compressible within the loads to which they are subjected under typical conditions and they are a far superior product in this respect. Being stamped as a whole from the laminated shim stock to the proper size they are also relatively inexpensive.

While I have shown and described a preferred form of embodiment of laminated shim and of the methods and apparatus for making it, I am aware that other modifications may be made to my invention within the scope and spirit thereof and I therefore desire a broad interpretation of the disclosure herein and the claims appended hereinafter.

I claim:

1. The process of producing a laminated shim having a plurality of laminations bonded together which comprises applying a non-ferrous bonding agent to a plurality of laminations, forming a stack of laminations having a substantially uniform coating of bonding agent between adjacent faces of the respective laminations, subsequently heating and compressing said stack to bond said laminations together, buffing the outer faces of said bonded shim stack, and finally forming the shim to the size and shape desired from said stack.

2. The process of bonding a plurality of sheets of shim stock together to form unitary laminated shim stock in which separate laminae may be peeled from the stock to vary the thickness thereof which comprises the steps of electroplating shim stock to form a flash coat of copper on the surfaces of the shim stock, subsequently coating the plated surfaces with a high lead solder, packing a plurality of sheets of coated shim stock together and pressing out substantially all of the solder to make a laminated stock.

3. The method of manufacturing laminated shims having thin laminae which comprises the steps of coating strips of metallic laminating material with a non-ferrous substance, cutting said material into strips of predetermined length, stacking said strips, heating and pressing said stacked strips to cause the strips to adhere together to form the desired stock, and subsequently cutting out the shims to size from the laminated shim stock.

4. The method of forming laminated shim stock from rolls of metal strip, which comprises, passing said strip through a cleaning bath, coating said strip with solder, scraping the excess solder from said strip, cooling the strip and coating said soldered strip with an antioxidizing material, cutting said coated strip into desired lengths, stacking a plurality of said strips together, placing separating members between layers of said strips, transferring the stack of said strips with the separating members therebetween to a heating and compacting device, enclosing said stacks of strip in a metallic envelope, heating said stacks of strips above the melting point of the solder, passing the stacks of strips in the envelope while hot between rolls to compact the same and squeeze out surplus solder, separating the stacks of strips and burnishing off the solder on the outside strip of each stack.

5. The method of forming laminated shims from rolls of metal strip, which comprises, passing said strip through a cleaning bath, coating said strip with solder, scraping the excess solder from said strip, cooling the strip and coating said soldered strip with an antioxidizing material, cutting said coated strip into desired lengths, stacking a plurality of said strips together, placing separating members between layers of said strips, transferring the stack of said strips with the separating members therebetween to a heating and compacting device, enclosing said stacks of strip in a metallic envelope, heating said stacks of strips above the melting point of the solder, passing the stacks of strips in the envelope while hot between rolls to compact the same and squeeze out surplus solder, separating the stacks of strips, burnishing off the solder on the outside strip of each stack, and punching individual laminated shims from said stock so formed.

EARLE L. YOUNG.